United States Patent [19]
Massell

[11] 3,772,505
[45] Nov. 13, 1973

[54] SYSTEM AND METHOD FOR ON-LINE SIMULATION OF BULK POWER SYSTEM TRANSIENTS AT VERY HIGH SPEEDS

[75] Inventor: Edward M. Massell, Hightstown, N.J.

[73] Assignee: Electronic Associates Inc., Long Branch, N.J.

[22] Filed: July 14, 1972

[21] Appl. No.: 272,086

[52] U.S. Cl...................... 235/185, 235/184, 333/16
[51] Int. Cl.............................................. G06g 7/50
[58] Field of Search............... 235/184, 185, 151.21; 333/16, 17, 18

[56] References Cited

UNITED STATES PATENTS

| | | | |
|---|---|---|---|
| 3,475,702 | 10/1969 | Ainsworth | 333/17 |
| 3,581,077 | 5/1971 | Damewood et al. | 235/184 |

OTHER PUBLICATIONS

Malling: Electronic Wattmeter Electronics November 1945.

Ryder et al.: A Thermocouple A. F. Wattmeter Radio–Electronic Engineering February 1953.

*Primary Examiner*—Felix D. Gruber
*Attorney*—Edward A. Petko

[57] ABSTRACT

In a simulation system, there is provided a system for controlling the effective impedance connected to a node or bus whose instantaneous voltage value varies sinusoidally at a known frequency. That instantaneous voltage value is applied to one input of a multiplier with the multiplier output being connected through an amplifier and an impedance to the bus. A control signal voltage is applied to the other input of the multiplier for providing an instantaneous current from the bus to produce an effective load whose magnitude is adjustable by the control signal.

10 Claims, 7 Drawing Figures

SYSTEM AND METHOD FOR ON-LINE SIMULATION OF BULK POWER SYSTEM TRANSIENTS AT VERY HIGH SPEEDS

BACKGROUND OF THE INVENTION

A. Field of the Invention

This invention relates to the field of art of simulation systems.

B. Prior Art

In present bulk power control systems, digital computers have been used to run off-line simulation to obtain criteria on the stability of the system. However, these off-line digital simulations have not been completely satisfactory since they have been able to only simulate a relatively small number of system states and faults. This small number results from the high cost of running a large scale digital simulation of the large number of possible system states and faults.

Simulations of bulk power system transients have been performed at low and at high speeds on hybrid computers and on network analyzers. Such simulations provide much information to the system designers who use the resultant information in design and to provide the on-line operator with guide lines with which to actually operate the bulk power system. However, situations arise during the actual operation of a bulk power system which are not or have not been foreseen prior to such actual operation. Accordingly, it would be very valuable to run a simulation the result of which can be shown to the on-line operator immediately. With this immediate information, the operator could then take corrective action. On the other hand, the simulation itself could take such immediate corrective action automatically through a conventional bulk power on-line computer. In this way, the reactions from a simulation may be included as part of the on-line computer program for presentation to the operator or in direct control. The high cost of simulation runs prevents the testing of more than a small fraction of possible system states. If it were possible economically to make substantially more runs, much more certainty would be achieved that no unstable system states were overlooked.

SUMMARY OF THE INVENTION

The invention is used in a simulation system of public or bulk power system transients which is run at very high speeds. A large number of simulations are performed of system states which actually occur in practice with the faults occurring and conditions being read at hundreds of points in the system. These simulations are performed much faster than in real time with measurements being made in microseconds after a failure has occurred and with the conditions being changed remotely. In this manner, there is determined whether any fault, even though the probability is relatively small, may cause a system disturbance of severe effect.

In one form of the invention, there is provided a simulated load which responds to a varying control signal voltage. The instantaneous voltage value at the bus is supplied to one input of a multiplier. The multiplier is connected through an amplifier and an impedance to the bus. The control signal voltage is applied to the other input of the multiplier for providing an instantaneous current from the bus to produce an effective load whose magnitude is adjustable by the control signal.

In another form of the invention, the real power of a signal is measured without the necessity of waiting for a full cycle of the system frequency. The instantaneous voltage of the measured signal and a signal proportional to a voltage corresponding to the measurement of the measured signal current are multiplied and differentiated twice. The output of the double differentiation is subtracted from the multiplied output to provide a signal corresponding to the measurement of real power of the measured signal.

In still another form of the invention, a signal having an instantaneous voltage varying at system frequency is continuously measured. The instantaneous voltage is differentiated with the absolute value taken of the square of the resultant differentiated signal. The absolute value of the square is also taken of the instantaneous voltage. Both squared signals are summed to produce a continuous measurement corresponding to the rms value of the instantaneous voltage value.

TABLE OF SYMBOLS $M$ = a variable by which another number is multiplied
$K$ = a variable by which another number is multiplied
$Y$ = admittance
$Y_D$ = desired admittance
$G$ = conductance
$B$ = susceptance
$Z$ = impedance
$R$ = resistance
$P$ = Power
$Q$ = reactive power
$E$ = Peak voltage
Erms = rms voltage
$I$ = Peak current
$e$ = Esinwt
$i$ = Isinwt
$e$ = instantaneous voltage
$e_r$ = instantaneous voltage at node (response)
$i$ = instantaneous current
$i_t$ = total instantaneous current
$w$ = angular frequency In an on-line operating situation, a simulating system may be associated with a particular bulk power system. When a new line or substation is added to the power system, there is required a physical modification of the simulation network. Loads and generating patterns continuously change and if the simulation system is to provide accurate information on system security at any particular moment, these changes are required to be duplicated in the simulation network.

The load changes must be capable of being set digitally whether this is accomplished automatically or by the intervention of the operator. In addition, the loads are required to be abruptly changed for transient analysis. For example, if this change is performed during a run, then a half-cycle becomes important. In order to provide high switching speeds, relays are not useful though electronic switches may be used with decade resistors, inductors and capacitors to select constant impedance loads. However, the use of such switching circuits is expensive and bulky and leakage capacitance would present many difficult problems.

It is known that constant impedance is not always a satisfactory representation of many bulk power loads. However, representation of other types of loads switched by digital control would require measurement of the voltage at the bus. Digital computation and control would likely overtax a digital computer if many such loads were involved. Accordingly, it is preferable to determine, at the beginning of a run or on digital command, the value of active or reactive current, power or admittance, and once set to have the simulated load respond to the voltage applied in a specified manner without further intervention from a digital computer.

DIGITAL SETTING OF LOAD CURRENT INDEPENDENT OF $e$ - EFFECTIVE Z VARIES WITH $e$

Figure 1:
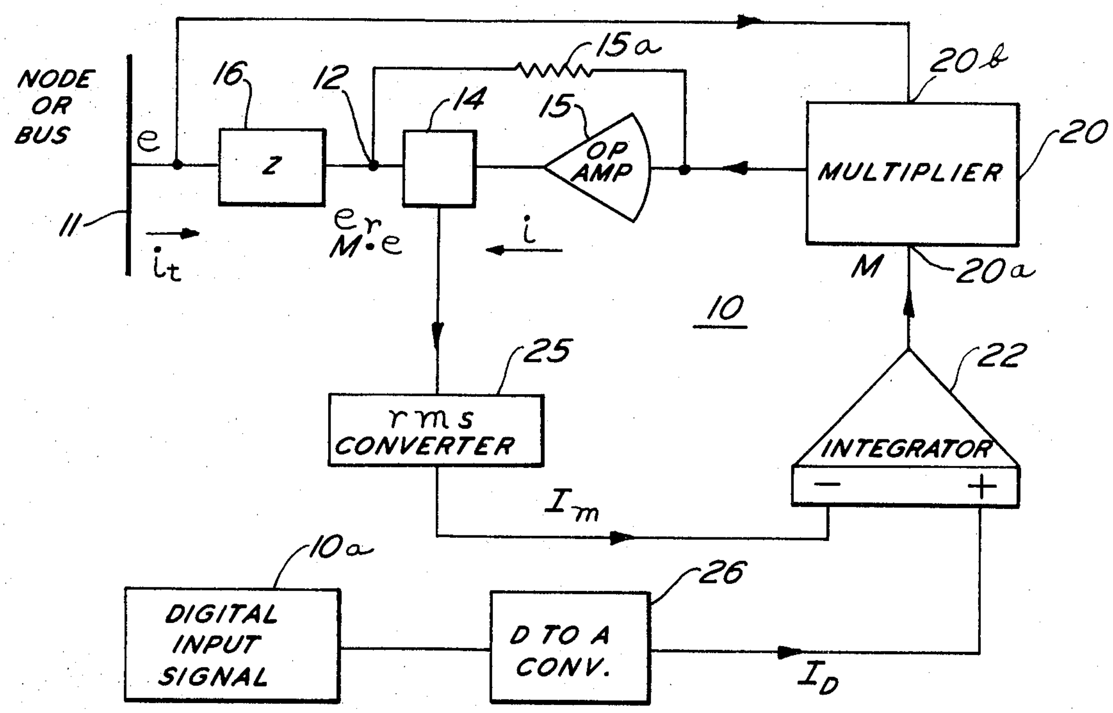
FIG. 1 is a block diagram of a simulated load changing system coupled to a bus in accordance with the present invention.

Referring now to FIG. 1, there is shown a system 10 in which the load current I at bus 11 may be set by a remote digital input signal 10*a* from a digital computer. As well understood, buss 11 is defined as a junction or node which is one of the major simulated points in the simulation system so that the significant behavior of the system may be determined. This is similar to that used in a digital simulation and corresponds to either physical connections at stations or substations or to simplifications of groups of such buses. These buses and connections in FIGS. 1–6 are also described in L.H. Michaels, "The AC/Hybrid Power System Simulator and Its Role in System Security." Conference on Power Industry Computer Applications, Boston, May, 1971, and J.D. Ryder and W.B. Broast, "A New Design for the AC Network Analyzer," AIEE, Electrical Engineering Trans. Vol. 65, pp 675–680, October, 1946.

System 10 has an auxiliary node 12 which is established by a connection to bus 11 by way of an impedance element $Z$ (16) which is selected to have an impedance value proper for the range of currents required to perform the simulation. Impedance element $Z$ (16) is selected based upon parameters of the actual load in the system being simulated by system 10. The parameters of the load are: type (i.e., resistive, inductive, capacitive); the maximum current to be drawn by the load; and the maximum voltage to be applied to the load. $Z$ is then the maximum voltage divided by the maximum current both values having been scaled in the programming of the simulation. A discussion of computer scaling is provided in *Electronic Analog and Hybrid Computation* by Korn and Korn, C. 1964, McGraw-Hill, Inc.

Scaling of system 10, and selection of a value for Z is similar to that in many special purpose analog computers, and is best explained by a numerical example.

The following might very well be practical limitations on the hardware embodiment.

Range of multiplier input $e$ (20*b*): ± 10V.

Range of multiplier input $M$ (20*a*): ± 1.

Range of multiplier amplifier output 12: ± 10V.

Range of $D$ to A converter, $I_D$: 0 to +5V.

Range of rms converter, $I_M$: 0 to +5V.

Range of operational amplifier: ±0.040 amps at ± 10V.

$I_M$ and $I_D$ may be scaled so that when they equal 5V the peak current $I$ in $i_t$=$I$ sin wt equals 0.040 amps (current into 20*b* assumed negligible). In that case the full range of digital control may be exercised without possibility of overloading the amplifier.

The simulations may require validity over a range of $E$ in $e_t = E$ sin wt from 6 to 10 volts. Since equation (2) reduces to $I$=( $-M$)$E/Z$, $Z$=(2)(6/.040)=300 ohms for the most exacting control conditions. If $E$ is greater than 6$V$, or if $I_D$ is less than 5 volts, $M$ will automatically be increased (algebraically) to reduce the value of $I$ and hence $I_M$. If the simulations do not require utilization of the full current range of the amplifier, precision may be improved by increasing $Z$ and reducing the ratio of $I_M$ to $I$ correspondingly. For example, in a particular simulation, the maximum current which would flow in bus 11 is a known value. Node 12 is driven from the output of an operational amplifier 15 whose output voltage is a fraction of the instantaneous voltage $e$ at bus 11. The value of this fraction depends on the value of the digital input signal.

The input of operational amplifier 15 is connected to the output of multiplier 20. Multiplier input 20b is connected to bus 11 so that the rapidly changing instantaneous voltage $e$ is applied to that input of multiplier 20. Applied to multiplier control input 20*a* is the more slowly varying variable M by which the voltage value of input 20*b* is multiplied. Thus, the instantaneous current output from multiplier 20 is proportional to $M{\cdot}e$. The characteristics of operational amplifier 15 are such so that the potential at node 12 is substantially equal to $M{\cdot}e$. Accordingly, the current flowing through impedance 16 is then equal to the difference between the voltage e at bus 11 and the voltage $M{\cdot}e$. at node 12 and may be expressed $$i_t = (e - M{\cdot}e.)/Z \quad (1)$$

which in turn reduces to $$i_t = (1-M)e/Z \quad (2)$$

Multiplier control input 20*a* is connected to an output of an integrator 22. The minus input of that integrator is connected to an output of an rms converter circuit 25 which will later be described with respect to FIG. 6. Converter 25 provides an output signal $I_m$ which is defined as the measured current amplitude; in this case; rms current. The positive input to integrator 22 is $I_D$ which is defined as the desired rms current. The desired current $I_D$ is initially produced by a digital computer which provides from block 10*a*, a digital input signal which is converted to analog form by converter 26. The instantaneous current $i$ which is converted to rms current $I_m$ is detected by a measuring system 14 described with respect to one embodiment of the system of FIG. 4. System 14 measures the instantaneous current delivered by operational amplifier 15 without changing the voltage at node 12.

As long as there is no difference in value between $I_m$ and $I_D$, then the output $M$ of integrator 22 remains constant. However, if $I_m$ is less than $I_D$, then integrator 22 decreases the value of M which in turn causes the instantaneous current to increase and which in turn is effective to cause $I_m$ to increase until it equals $I_D$. The converse is also true as in a typical servo system. In this manner, by controlling the instantaneous current, system 10 maintains the rms current as actually flowing through impedance 16 equal to a desired current $I_D$. Thus, the instantaneous current drawn by impedance element 16 is maintained so that the rms value of that current will be equal to $I_D$ regardless of what changes are made in the value of $I_D$ and regardless of the value of voltage $e$ at bus 11. It will be understood that $I_m$ may be another measured current amplitude such as average or peak value of the sine wave.

As previously described, the value of $I_D$ is determined from simulation requirements or from the system state. In a particular embodiment, impedance element 16 may be resistive only which corresponds to a setting of real current or current in phase with voltage $e$. If element 16 is a capacitor or an inductor, then the current drawn will be reactive. Separate circuits may be used for reactive currents so that these may be controlled independently.

It will be understood that the source of $I_D$ may be as illustrated, viz., source 10*a* and converter 26. However, any other source of a desired rms current may be used and a computer is not necessarily required. If the source is an analog one, then converter 26 is not required.

DIGITAL SETTING OF CONSTANT IMPEDANCE LOAD — Z INDEPENDENT OF e

Figure 2:
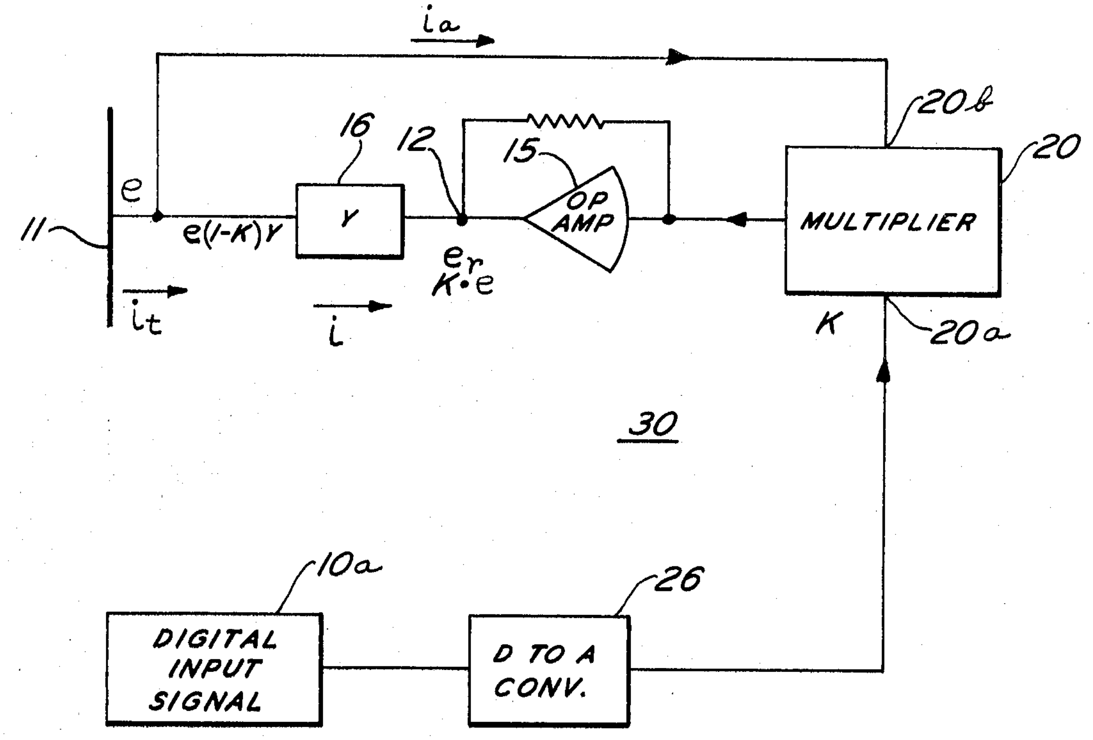
FIG. 2 is a block diagram of another embodiment of the simulated load changing system of FIG. 1.

As shown in FIG. 2, electrically adjustable impedance or admittance loads may be simulated much more easily than system 10 previously described. Multiplier 20 and operational amplifier 15 define a voltage follower for system 30 which is used to vary the effective impedance of the load.

As in FIG. 1, bus 11 is connected to control input 20*b* of multiplier 20 and the output of the multiplier is connected by way of operational amplifier 15 to node 12 and one side of an admittance element 16. A digital input signal source 10*a* is coupled by way of a $D$ to A converter 26 directly to input 20*a* to provide the $K$ variable.

The instantaneous current $i_t$ flowing from bus 11 is equal to the sum of currents flowing (1) into element 16 now indicated as admittance $Y$ and (2) as leakage current into multiplier 20. Thus, the equation for $i_t$ is $$i_t = i + i_a \qquad (3)$$

where:

i = current through element 16

*ia* = current required to drive multiplier 20

As in system 10, the voltage at the output of amplifier 15 is equal to $K\cdot e$ with $K$ being used to avoid confusion with $M$ of FIG. 1.

The current through element 16 may be expressed as $$i = Y(e - K\cdot e) \qquad (4)$$

Further, the current necessary to drive multiplier 20 may be expressed as $$i_a = eY_a \qquad (5)$$

Therefore, the current drawn at bus 11, $i_t$, may be expressed by taking equations 3–5 and substituting $$i_t = e[(1-K)Y + Y_a] \qquad (6)$$

Variable $K$ may be set by digital input signal source 10*a* to be in accordance with the following equation.

$$K = 1 + (Y_a - Y_D)/Y \qquad (7)$$

In equation (7), it will be understood that $Y_a$ and $Y$ are known quantities while $Y_D$ is defined as the desired admittance. $Y_D$ may be determined from the corresponding system state. By substituting equation (7) in equation (6), there results $$i_t/e = Y_D \qquad (8)$$

In this manner, there is provided a desired admittance $Y_D$ which is adjustable by a computer through signal source 10*a*.

If element 16 is of constant power factor, only one of the systems 30 may be required. However, if it is desired to have independent control over conductance and susceptance loads, two separate systems 30, one resistive, the other reactive, may be used in parallel with respect to the same bus 11. If $K$ is greater than one, then a capacitive susceptance may be converted to an inductive susceptance.

DIGITAL SETTING OF CONSTANT POWER LOAD INDEPENDENT OF e — EFFECTIVE Z VARIES WITH e

Figure 3:
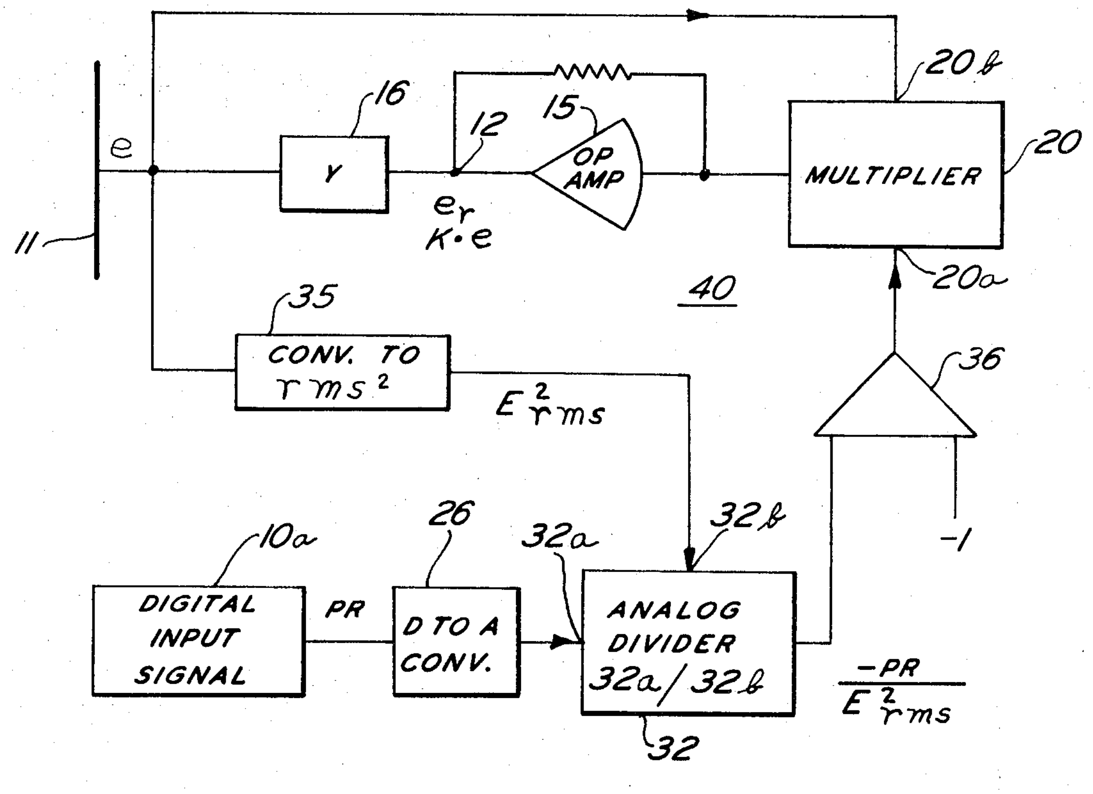
FIG. 3 is a block diagram of a further embodiment of the load changing system of FIG. 1.

Expansion of the systems 10 and 30 previously described may also be used in a system 40 shown in FIG. 3 to control real power P. As in system 30, system 40 has multiplier 20 connected by way of operational amplifier 15 through node 12 and admittance element 16 to bus 11. The instantaneous value of voltage e at bus 11 is converted to a square of its rms value in converter system 35. System 35 is described in detail with respect to FIG. 6 with the modification in which circuit 58 is a linear network. The output of system 35 is applied to one input of an analog divider 32. The other input to the divider is from the digital input signal source 10*a* through converter 26. The signal from source 10*a* is determined by the desired power setting $P$ and the known value of conductance $G$ of element 16 which is then converted to $PR$. The output of divider 32, as shown, is applied to one input of a summer 36, the other input of which has a constant signal applied thereto of minus 1.

If a resistive load is to be used and $e_r$ is to be maintained in phase with e by making it equal to K·e, then $$i = (1-K)e/R \quad (9)$$

$$\text{power} = (1-K)E_{rms}^2/R \quad (10)$$

Thus, if $K$ is made equal to $$K = 1-(PR/E_{rms}^2) \quad (11)$$

$$\text{power} = (1-K)\ E_{rms}^2/R \quad (12)$$

$$= PR/E_{rms}^2 \times E_{rms}^2/R \quad (13)$$

$$\text{power} = P \quad (14)$$

As seen from the foregoing equations, power $P$ will be at a desired value; $Y_a$ being ignored in this case. Since $K$ remains constant during the cycle to preserve phase relationship, rms voltage may be measured in the manner to be discussed.

MEASURING CURRENT WHILE CONTROLLING VOLTAGE $e$

Figure 4:
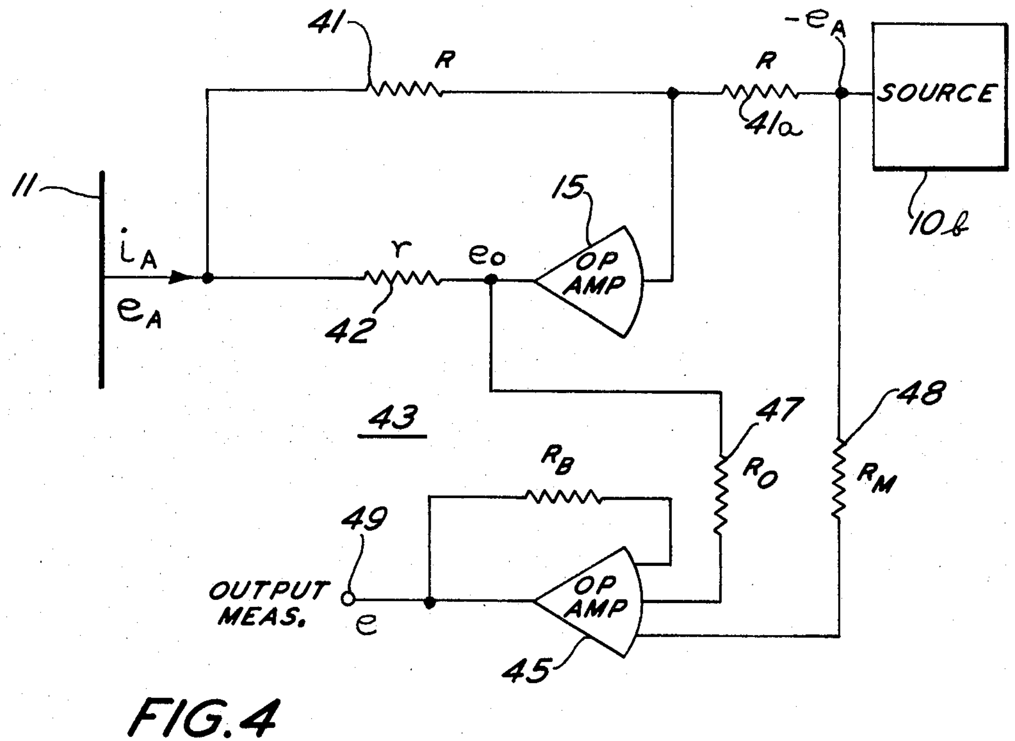
FIG. 4 is a block diagram of a current measuring system used in FIG. 1.

In the digitally controlled loads and other applications previously described, control of current depends on being able to measure current. As shown in FIG. 4, system 43 provides a simple method of measuring current which may be used without severely affecting the performance of an operational amplifier as in system 10 of FIG. 1. Operational amplifier 15 of system 43 has a gain selected so that the voltage e at bus 11 is maintained equal to $e_A$ as long as the operational range of amplifier 15 is not exceeded.

A feedback resistor 41 for amplifier 15 has a value $R$ and is connected in series with a resistor 41$a$ also having the value $R$, the other side of which is connected to a source 10$b$. Source 10$b$ may be considered to be similar to a generator providing a signal at the simulated power line frequency. In practice, source 10$b$ may comprise digital input signal source 10$a$ and converter 26 as shown in FIGS. 1–3. Source 10$b$ is also connected by way of a resistor 48, having a value $R_M$, to one input of an operational amplifier 45. The other input of amplifier 45 is connected by way of a resistor 47, having a value $R_0$, to the output of amplifier 15. The amplifier 15 output is also connected by way of an output resistor 42 to bus 11.

It will be shown in the discussion to follow that the voltage e is controlled at bus 11 while current is measured at output 49 of amplifier 45. System 43 produces whatever current $i_A$ is necessary to maintain voltage $e_A$.

By applying Kirchhoff's laws, it can be shown that current $i_A$ drawn from bus 11 is the sum of the currents through the two resistors 41 and 42. Thus, $$i_A = (e_A - e_O)\ /\ r + e_A\ /\ R = -e_O\ /\ r + e_A\ (1/r + 1/R) \quad (15)$$

The output voltage of operational amplifier 45 is $$e = -e_O R_B\ /\ r_O + e_A R_B\ /\ R_M \quad (16)$$

The current through resistor 41 may be accounted for in this system by selecting $R_B/R_M$ to be equal to $R_B/R_O + 1/R$. If there is also selected $R_B/R_O$ equals $1/r$, then by direct substitution, the factors in equation (16) provide $e = i_A$.

System 43 may be used in the digital current load setting circuit of FIG. 1 by using an additional operational amplifier and resistors so that an independent voltage, rather than current, is available for multiplier 20. System 43 may also be used as a generator.

If instantaneous values can be used directly for control as in the case with constant impedance loads, no appreciable delay would be produced by using system 43 to provide the measurement. However, in the usual case, it is rms current or power that is required to be measured. If steady state currents or voltages are assumed to be perfect sine waves, simple scaling is sufficient to convert peak or average values to rms. Well known peak detecting circuits provide measurement of peak values within one-half cycle and the detection of phase would then permit computation and further use of active or reactive power. Many known peak detection and phase detection circuits are sensitive to noise and would, therefore, cause difficulty in this application. While averaging by filtering techniques would avoid such difficulties, the delays produced may be of the same order of magnitude as the time of circuit breaker clearing and, therefore, are not tolerable.

The foregoing may be better understood when considering the product of instantaneous voltage and current.

$$ei = p = E(\sin wt)I\ \sin(wt+\phi) \quad (17)$$

$$+ EI\ [(\cos\phi)\sin^2 wt + \tfrac{1}{2}(\sin\phi)\sin 2wt] \quad (18)$$

This has a period of $pi$ in $wt$.

$$\int_0^\pi (\sin^2 wt)d(wt) = \frac{\pi}{2} \quad (19)$$

$$\text{while} \int_0^\pi \sin\,(2wt)d(wt) = 0 \quad (20)$$

Therefore, it will now be seen that the average power over a half period of line frequency is equal to $P = EI/2\cos\phi$. The first term in the instantaneous power thus averages out to the average power and the second term averages to zero in one-half period. Thus, the unfiltered instantaneous power may be used in the generator simulation since it is integrated twice to compute frequency and swing angle.

A precise and fast measurement that is insensitive to noise may be provided by rectifying and integrating for exactly one-half cycle. This time interval would have to follow system frequency if accuracy is to be observed. Another approach, somewhat more complicated, would be to begin integration at a zero crossing and terminate the integration at the next zero crossing. In this approach, the error that is introduced is less than the jitter produced in phase measurements since the rate of integration would be low near the switching points. In order to measure power, the instantaneous values of voltage and current are first multiplied and then the product is integrated for an integral number of half-cycles.

POWER MEASUREMENT BY CONTINUOUS SUBTRACTION OF DOUBLE FREQUENCY ZERO AVERAGE TERMS FROM INSTANTANEOUS POWER

Figure 5:
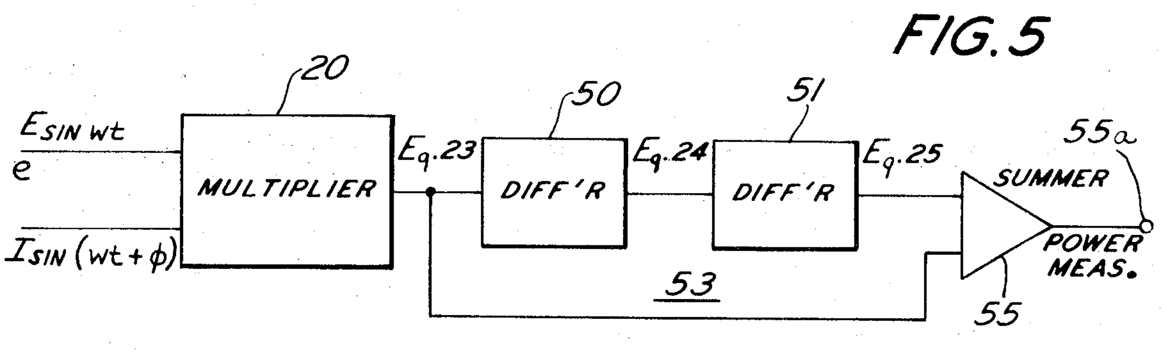
FIG. 5 is a block diagram of a system for measuring real power.

FIG. 5 illustrates system 53 which provides another way of measuring peak or average values of regular, sinusoidal waves by using the known characteristics of the wave. The product of instantaneous voltage and current provides $$ei = EI(\cos\phi \sin^2 wt + \sin\phi/2 \sin 2wt) \quad (21)$$

$$= EI[\cos\phi)\ (½ - \cos 2wt/2) + \sin\phi/2 \sin 2wt] \quad (22)$$

$$= EI/2\ (\cos\phi - \cos 2wt + \sin\phi \sin 2wt) \quad (23)$$

In the system of FIG. 5, the voltage corresponding to the instantaneous voltage and the voltage corresponding to the measured current at a node are multiplied in multiplier 20. The output of multiplier 20 produces a signal corresponding to equation 23 which is applied to a pair of cascaded differentiators 50, 51. The differentiators are scaled to correspond to line frequency so that the output voltage equals $-1/2w$ which is the time derivative of the input. Thus, differentiator 50 yields at its output $$EI/2\ (\sin 2wt + \sin\phi \cos 2wt) \quad (24)$$

This output is differentiated by differentiator 51 which yields $$EI/2\ (\cos 2wt - \sin\phi \sin 2wt) \quad (25)$$

The output of differentiator 51 is subtracted from the output of multiplier 20 by summer 55 which yields $$½\ EI \cos\phi \quad (26)$$

Equation (26) is the well known formula for real power and, thus, output 55*a* of summer 55 provides a signal corresponding to measurement of real power. If current or voltage is shifted by analog computer means, reactive power may also be measured.

In this manner, system 53 provides a measurement of real power as rapidly as possible without the necessity of waiting for a full cycle. The accuracy of the foregoing computation depends on the closeness of the frequency and the scaling constants with possible difficulty in interpreting the power measurement during a transient. Instead of double differentiation, double integration may be used to decrease noise effects.

CONTINUOUS MEASUREMENT OF POWER OR RMS VOLTAGE OR CURRENT

The continuous measurement of peak, average or rms value of a sinusoid of known frequency may be accomplished by means of several operations as follows.

$$\cos^2 x + \sin^2 x = 1 \quad (27)$$

and $$1/w\ d \sin(wt) = \cos(wt)$$

If $E^2$ is the required variable, as previously described with respect to the control of power, the squaring function in a feedback loop may be replaced by a constant resistance.

Figure 6:
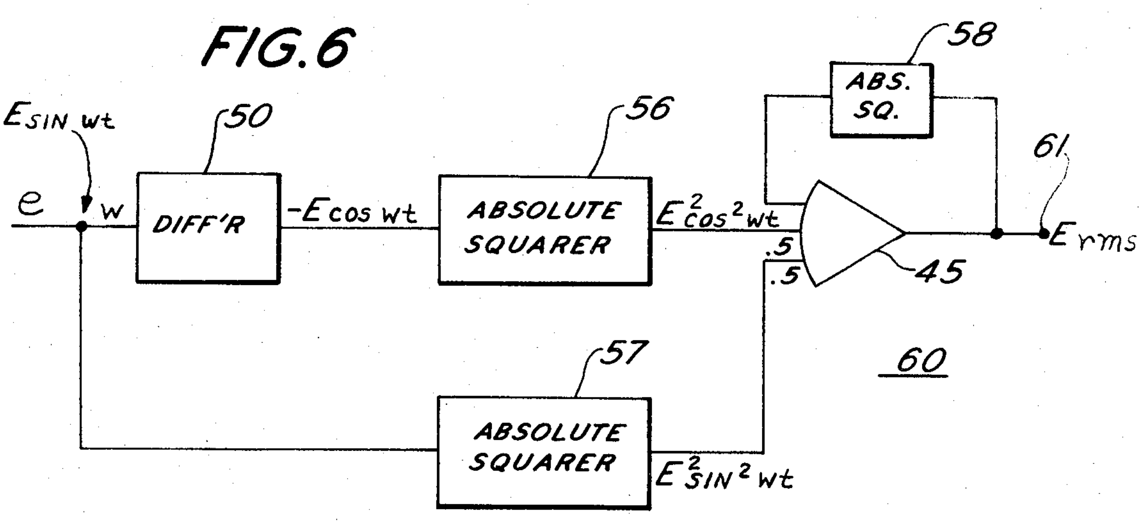
FIG. 6 is a block diagram of a continuous measuring system used in FIGS. 1 and 3.

A continuous measurement system 60 is shown in FIG. 6 in which input signal e is applied to a differentiator 50 which is scaled to produce at its output $1/w$ times the time derivative of its input. The input signal is also simultaneously applied to an absolute squaring circuit 57. An absolute squaring circuit is known to produce at its output the absolute value of the square of its input voltage. The output of differentiator 50 is applied to absolute squaring circuit 56 with the outputs of circuits 56 and 57 being applied to an input of an operational amplifier 45. The signals are summed in that amplifier which has connected in its feedback loop, an additional absolute squaring circuit 58. Accordingly, the output of amplifier 45 is $$\sqrt{E^2/2(\cos^2 wt + \sin^2 wt)} = E_{rms} \quad (28)$$

In this manner, system 60 produces a continuous measurement of the rms voltage of its input. If network 50 is a resistance, output 61 will be $E^2$ which is also constant if $E$ and $w$ are constant.

In FIGS. 1–6, elements not specifically described in detail are well known in the art and specific examples thereof are particularly described in a text by Korn and Korn, "Electronic Analog and Hybrid Computers," McGraw-Hill, 1964.

MONITORING

The following is a description of how some of the previously described systems as shown in FIGS. 1–6 may be combined with known techniques to obtain information quickly from the simulation. The cascaded actions of relays may be a likely requirement for a valid determination of failure. Simulated faults do not require simulation of relay action to determine the operation of the associated line circuit breakers since three-phase faults close to an end of the line are being simulated. However, it would be necessary to measure whatever currents or power flows are capable of activating backup relays or line relays in lines other than the one with the short.

A combination of a dual multiplexer and digitally set analog line simulator may be used to determine the apparent line impedance as viewed from either end, as well as the current, power flow and phase difference across the line, using as inputs the two nodes which define the line. A pair of multiplexers would then permit monitoring any two node voltages or phase angles, and any single line flow or apparent impedance. Conventional analog/hybrid techniques may be used to generate the derived variables of interest, compare them with relay settings and simulate the control responses.

The length of time required for switching the multiplexers to a new pair of nodes, readjustment of the line simulator and measuring elements need not exceed a few tens of microseconds, but the measurements themselves will probably require on the order of 100 microseconds minimum in a system using 6Kh.

The purpose of the following discussion is to demonstrate how it is possible to timeshare a completely flexible representation of a small portion of a simulated system without slowing down the overall simulation and at the same time permitting electronic selection of the portions to be so represented. Most digital transient programs perform a computation every three or four cycles. Using this as the guide line, then three cycles may be used at the simulated rate of 500 microseconds to perform the timeshared computations. Thus, whatever may be accomplished by way of monitoring analog variables, multiplexing, initializing, computation, in five hundred microseconds may be included in the simulation. Considerable additional power may be added to the simulator in this manner. In this simulation, all buses would have associated loads which are modified by digital command. These output commands may require approximately 100 microseconds to become effective and are dimensioned as active and reactive current, power or admittance. This may permit a relatively large number of lines to be added at the beginning of a run without requiring digital computation during a run.

Figure 7:
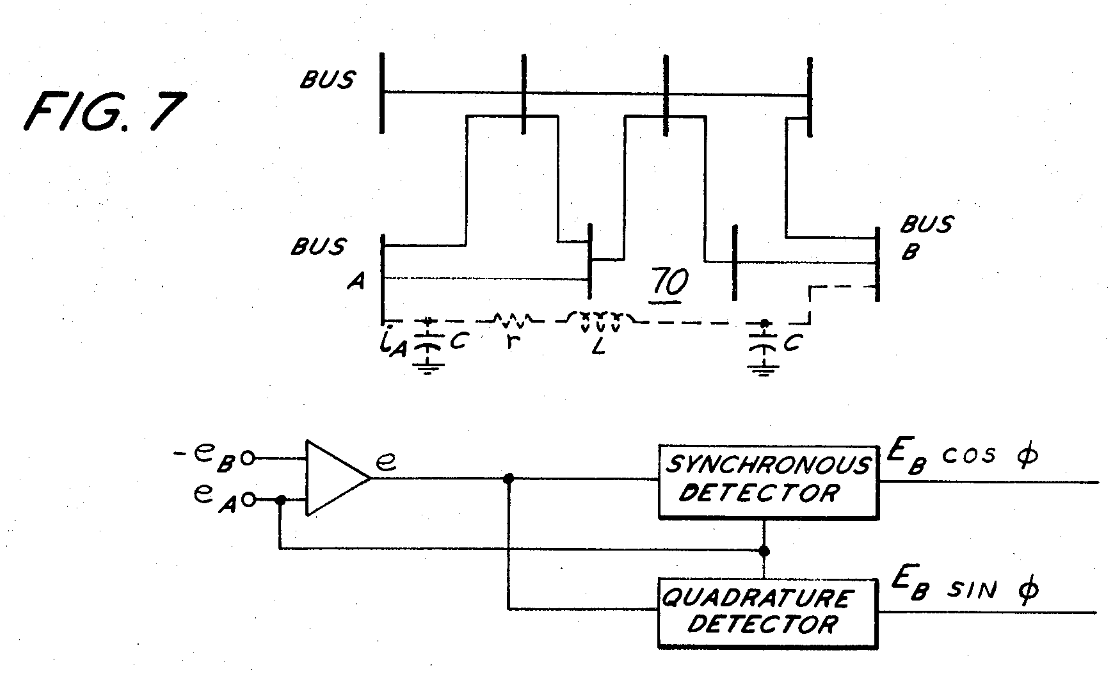
FIG. 7 is a block diagram of phantom line and component measurement.

FIG. 7 shows a network 70 for which it is possible to determine the effect of adding a line equivalent to series resistance and inductance with shunt capacitance 2C between buses A and B. The current drawn by this line is $$i_A = (e_A - e_B) / (r + jX_L) - e_A / jX_c \quad (29)$$

Computation and correction for the second term in equation (29) may be performed separately for simplification. If a capacitive reactance has been specified for the load at bus $A$, the only computational requirement is to add the value of $X_c$ to the original load. On the other hand, if reactive currents have been specified, then a new desired rms current is required to be output to a converter 26 which is determining the amount of reactive current drawn as described with respect to FIG. 1 by adding the value $E_A/X_c$ . In this case, as $E_A$ will vary during the run, its rms value may be measured as described with respect to FIG. 6 and divided by $X_c$ in the digital computer before being output to converter 26.

Determination of the term $(E_A - E_B)/(r + jX_L)$ and its proper phase relationship to $E_A$ for further modification of active and reactive load settings, would probably cause excessive computational load if digital computation were used directly from the variables $E_A$ and $E_B$ including their phase relationship. Dual, individually addressable multiplexers, however, may be used as the input to a small hybrid computer capable of producing the necessary information without significant delay.

Let $\phi$ be the angle by which $e_B$ leads $e_A$ and $E_A$ and $E_B$ be the rms values of these voltages. Then, to relate phantom line currents through the series elements $r$ and $L$ to the voltage at bus $A$ $$\frac{E_A - E_B \cos\phi - jE_B \sin\phi}{r + jwL} = (E_A - E_B \cos\phi)\frac{r - jwL}{z^2} - j(E_B \sin\phi)\frac{r - jwL}{z^2} = \quad (30)$$

$$\frac{r}{z^2}(E_A - E_B \cos\phi) + \frac{wL}{z^2}(E_B \sin\phi) - j\left[\frac{wL}{z^2}(E_A - E_B \cos\phi) + \frac{r}{z^2}(E_B \sin\phi)\right] \quad (31)$$

$r/z^2$ and $wL/z^2$ may be generated at the beginning of the run and output by the digital computer to the $D$-$A$ multipliers in the hybrid subsystem. $e_A$ is converted to a switching signal and applied to the synchronous and quadrature detectors to obtain the components of $e_B$ with respect to $e_A$. These are then used to generate the analog inputs (in parenthesis) in the above equation which are applied to the D-A multipliers, the outputs of which in turn can be used after reconversion to digital form as modification of the real and reactive current settings for bus $A$. Additional analog elements can be utilized if the settings are in terms of power or admittance.

What is claimed is:

1. A combination for simulating the changes in load in a power distribution system by controlling current through an impedance means said combination being connected to a first node whose instantaneous voltage value varies sinusoidally at a known frequency comprising means for multiplying said instantaneous voltage value applied to a first input by a varying control signal voltage applied to a second input with the resultant multiplied value produced at a multiplier output, amplifier means coupled to said multiplier output for providing at a second node at an output of said amplifier means a voltage corresponding in value to said resultant multiplied value, impedance means having a constant value connected between said amplifier means and said first node for developing a current proportional to the difference between said instantaneous voltage value and the voltage at said second node, and source means for applying as said second input a varying control signal voltage by which said instantaneous voltage value is multiplied for providing an instantaneous current at said first node as developed by said impedance means to produce an effective load whose magnitude is adjustable by said source means.

2. The system of claim 1 in which there is provided means connected to said first node for converting said instantaneous voltage value to a first voltage proportional to the square of its amplitude, said source means comprising means for providing a desired voltage, means connected thereto for dividing said desired voltage by said first voltage, and means connected to said dividing means for applying the resultant divided signal to said second multiplier input as said varying control signal voltage for controlling the real power load of said load changing system in accordance with said desired voltage regardless of changes in said instantaneous voltage value.

3. The system of claim 1 in which there is provided means connected to said second node for converting the instantaneous current flowing through said second node to a measured current amplitude, said source means comprising means for providing a desired current, subtraction means connected to receive said measured current amplitude and said desired current for detecting the difference in value between said measured current amplitude and said desired current, the output of said subtraction means coupled to said second multiplier input as said varying control signal input for controlling said instantaneous current so that the amplitude of said instantaneous current corresponds to said desired current.

4. In a simulation system of public power network transients in which there are performed a large number of simulation runs, at least one simulated load changing system which comprises a bus defining one of the simulated elements in said simulation system and having an instantaneous voltage value varying at system frequency, means for multiplying said instantaneous voltage value applied to a first input by a varying control signal voltage applied to a second input with the resultant multiplied value produced at a multiplier output, amplifier means coupled to said multiplier coutput for providing at a node a voltage substantially equal in value to said resultant multiplied value, impedance means having a constant value connected between said amplifier means and said bus, for developing a current proportional to the difference between said instantaneous voltage value and the voltage at said node, and source means for producing at said second input said varying control signal voltage by which said instantaneous voltage value is multiplied for providing an instantaneous current from said bus as developed by said impedance means, to produce an effective load whose magnitude is adjustable by said source means.

5. The simulation system of claim 4 in which said source means includes a digital input signal source coupled to a *D* to *A* converter for producing said varying control signal voltage.

6. The simulation system of claim 4 in which there is provided means connected to said node for converting instantaneous current flowing through said node to a measured current amplitude, said source means comprising means for providing a desired current corresponding to said control signal voltage, and difference means connected to receive said desired current and said measured current amplitude for detecting the difference in value between said measured current amplitude and said desired current, the output of said difference means being coupled to said second multiplier input as said varying control signal for controlling said instantaneous current so that the amplitude of said instantaneous current corresponds to said desired current regardless of changes in value of said instantaneous voltage value.

7. The simulation system of claim 6 in which said difference means includes means for integrating the difference between said measured current amplitude and said desired current and for applying the resultant integrated signal to said second multiplier input as said varying control signal.

8. The simulation system of claim 7 in which said measured current amplitude is an rms value.

9. The simulation system of claim 4 in which there is provided means connected to said bus for converting said instantaneous voltage value to a voltage proportional to the square of its amplitude, said source means comprising means for providing a desired voltage corresponding to said control signal voltage, means connected thereto for dividing said desired voltage by said squared voltage, and means connected to said dividing means for applying the resultant divided signal to said second multiplier input as said varying control signal voltage for controlling the real power load of said load changing system in accordance with said desired voltage regardless of changes in value of said varying instantaneous voltage.

10. The simulation system of claim 9 further including second signal source means for generating a constant signal corresponding to −1 and in which said applying means includes a summer connected to said dividing means and to said second source means having (1) said resultant divided signal applied to one input thereof and (2) said constant signal corresponding to −1 applied to the other input, the output of said summer being connected to said second multiplier input.

* * * * *